United States Patent [19]
Maine

[11] Patent Number: 5,666,647
[45] Date of Patent: Sep. 9, 1997

[54] REMOTE POSITION DETERMINATION

[75] Inventor: Kristine Patricia Maine, Phoenix, Ariz.

[73] Assignee: Motorola, Inc., Schaumburg, Ill.

[21] Appl. No.: 683,184

[22] Filed: Jul. 18, 1996

Related U.S. Application Data

[63] Continuation of Ser. No. 395,528, Feb. 28, 1995, abandoned, which is a continuation of Ser. No. 923,755, Aug. 3, 1992, abandoned.

[51] Int. Cl.$^6$ .................................................. H04B 7/185
[52] U.S. Cl. ...................... 455/12.1; 455/13.1; 455/13.2; 455/456; 340/991
[58] Field of Search .................... 455/12.1, 13.1, 455/13.2, 13.3, 13.4, 34.1, 54.1, 56.1, 63, 67.1; 340/539, 988, 989, 991, 993; 342/352, 353, 350, 357

[56] References Cited

U.S. PATENT DOCUMENTS

| | | | |
|---|---|---|---|
| 3,384,891 | 5/1968 | Anderson | 342/853 |
| 4,658,357 | 4/1987 | Carrol et al. | 364/406 |
| 4,731,870 | 3/1988 | Black et al. | 455/127 |
| 4,804,937 | 2/1989 | Barbraux et al. | 340/525 |
| 4,831,539 | 5/1989 | Hagenbuch | 340/988 |
| 4,872,015 | 10/1989 | Rosen | 455/353 |
| 4,918,425 | 4/1990 | Greenberg et al. | 340/539 |
| 4,952,928 | 8/1990 | Carrol et al. | 340/825.54 |
| 5,014,206 | 5/1991 | Scribner et al. | 340/825.49 |
| 5,043,736 | 8/1991 | Darnell et al. | 342/357 |
| 5,068,656 | 11/1991 | Sutherland | 340/989 |
| 5,343,512 | 8/1994 | Wang et al. | 455/13.1 |

FOREIGN PATENT DOCUMENTS

| | | | |
|---|---|---|---|
| 0250105 | 5/1987 | European Pat. Off. | G01S 5/02 |
| 0365885 | 5/1989 | European Pat. Off. | H04B 7/204 |
| 0467651 | 7/1991 | European Pat. Off. | H04B 7/185 |
| 9013186 | 4/1990 | Sweden | G01R 55/00 |
| 9205672 | 9/1991 | Sweden . | |

OTHER PUBLICATIONS

The Evening Star's article "Satellite Will Track Herd of 7,000 Elk" Feb. 16, 1970.

*Primary Examiner*—Edward F. Urban
*Assistant Examiner*—Thanh Le
*Attorney, Agent, or Firm*—Sherry J. Whitney; Robert M. Handy

[57] ABSTRACT

A constellation of satellites which are distributed around the earth serves as a communications infrastructure that supports autonomous position determination and reporting of that position to a remote location. Satellites continuously broadcast acquisition signals. Position determining units are remotely programmed to activate upon the occurrence of an activation event. If PDUs can capture an acquisition signal, then they engage in activities which lead to determining their position and they coordinate their communications with the requirements of the communications infrastructure. To determine position, a location pulse may be transmitted on a regular schedule. The location pulse is transported between a fast moving satellite and a PDU. The movement of the satellite causes different location pulses to have different propagation delays and Doppler characteristics. By analyzing changes in propagation delays and Doppler characteristics, a procedure determines a position for a PDU.

21 Claims, 8 Drawing Sheets

| PROGRAMMABLE PARAMETERS STORED IN PDU MEMORY ||| 
|---|---|---|
| ACTIVATION EVENT TABLE | TIME | PARAMETER(S) |
| | SENSOR #1 | PARAMETER(S) |
| | ⋮ | ⋮ |
| | SENSOR #N | PARAMETER(S) |
| POSITION DETERMINATION PARAMETERS TABLE |||
| DATA LOG TABLE | TIME | LOCATION/(FREQ. TAG) |
| | TIME | PARAMETER(S) |
| | ⋮ | ⋮ |
| | TIME | PARAMETER(S) |
| CALL-IN EVENT TABLE | TIME | PARAMETER(S) |
| | SENSOR #1 | PARAMETER(S) |
| | ⋮ | ⋮ |
| | SENSOR #N | PARAMETER(S) |
| | OTHER | PARAMETER(S) |
| MONITORING OFFICE'S IDENTIFICATION OR PHONE NUMBER |||
| SLEEP EVENT TABLE | TIME | PARAMETER(S) |
| | SENSOR #1 | PARAMETER(S) |
| | ⋮ | ⋮ |
| | SENSOR #N | PARAMETER(S) |
| | OTHER | PARAMETER(S) |

*FIG. 10*

REMOTE POSITION DETERMINATION

This is a continuation of Ser. No. 08/395,528, filed on Feb. 28, 1995, abandoned, which is a continuation of Ser. No. 07/923,755, filed Aug. 3, 1992 abandoned.

TECHNICAL FIELD OF THE INVENTION

The present invention relates generally to remotely determining the position of an object. More specifically, the present invention relates to the use of an RF communication system to determine the position of a position determining unit (PDU) and to report that position to a monitoring office.

BACKGROUND OF THE INVENTION

Many diverse applications need to remotely determine the position of various objects. For example, researchers and managers of wild or domestic animals often need to know where animals are located. In addition, managers of fleets, whether of automobiles, trucks, rail cars, planes, or ships, need to know locations for their vehicles. In still other applications, the locations of balloons, buoys, and other platforms need to be remotely known from time-to-time. Preferably, the locations of such objects are reported as needed to a remote monitoring office. The remote position determination process incorporates two basic steps. Namely, the objects' positions are determined from time-to-time, and data describing those positions are communicated to the monitoring office.

Conventional remote position determination systems force their users to make difficult compromises. For example, researchers currently utilize a satellite-based remote position determining system operated by the Centre National d'Etudes Spatials (CNES, France), NASA, and the NOAA. Transmitters are placed on objects to be tracked, and compatible receivers are located on one or two orbiting satellites. The satellites record the transmitted signals they receive and later dump data describing these signals to a ground processing station for Doppler-based calculations which determine positions. While this system can determine locations at some very remote locations, it is expensive, inflexible, and unreliable. Moreover, it is available only for scientific research or experimental tracking, not for commercial applications. Consequently, only a small portion of the remote position determination needs are met.

In particular, the unreliability of this conventional system is due, at least in part, to the fact that transmitters engage in numerous unnecessary transmissions and thereby consume large amounts of electrical power and reduce the life of the transmitter. Moreover, the ability of only one or two overhead satellites to receive a transmitter's signal and the ability of the ground processing station to accurately resolve the transmitter's location are dubious at best. The satellites can track only transmitters which happen to be under their ground paths, and accurate position determination requires that the transmitted signal be received at a satellite for a duration of around 20 minutes. Furthermore, the ground processing station often takes several weeks to provide location data to a monitoring office. By the time that a monitoring office learns of a location, the location data are stale. The inflexibility is due, at least in part, to an inability to control the operation of the transmitter after it is in the field and the limited life of the batteries used by the transmitter. Often times, the power drain of transmitters permits them to remain operational for only a few weeks at best. The high cost is due, at least in part to the massive infrastructure which must be in place to support remote position determination.

Other remote position determination systems have been suggested. For example, one system suggests coupling a LORAN receiver with conventional cellular radiotelephones. The reliability of this system may improve upon the above-discussed satellite-based system in some ways, but reduce reliability in other ways. For example, this and similar systems would be operational only in locations where both LORAN signals can be received and where conventional cellular telecommunications are available. This limitation makes such a system inappropriate for many applications, such as those that require tracking over a broad area or those that require tracking in very remote areas. Moreover, the physical requirements for an antenna which receives LORAN signals make such a system inappropriate for applications requiring small physical size. Furthermore, the reliance upon two diverse systems, such as a LORAN positioning system and a cellular telecommunication system, increases complication and cost while proportionately increasing unreliability, weight, and power consumption.

SUMMARY OF THE INVENTION

Accordingly, it is an advantage of the present invention that an improved system, method, and/or apparatus for remote position determination is provided.

Another advantage of the present invention is that reliable, flexible, and low cost remote position determination is provided.

Yet another advantage is that the present invention manages power consumption to extend battery life in a position determining unit.

Still another advantage is that the present invention utilizes a single communication system infrastructure to deliver communications and to determine position.

Yet another advantage is that the present invention yields reliable results over a substantially worldwide range.

The above and other advantages of the present invention are carried out in one form by an improved method for operating a mobile position determining unit (PDU) in cooperation with a communication system. The method calls for receiving an acquisition signal from the communication system. In response to the receipt of an acquisition signal, cooperative communications are carried on with the communication system to resolve and report a position for the PDU. The cooperative communications are carried on through the transmission of messages from the PDU for receipt by the communication system.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 10 shows an exemplary block diagram of data items maintained in memory structures stored within a memory of a PDU;

DETAILED DESCRIPTION OF THE PREFERRED EMBODIMENTS

Figure 1:
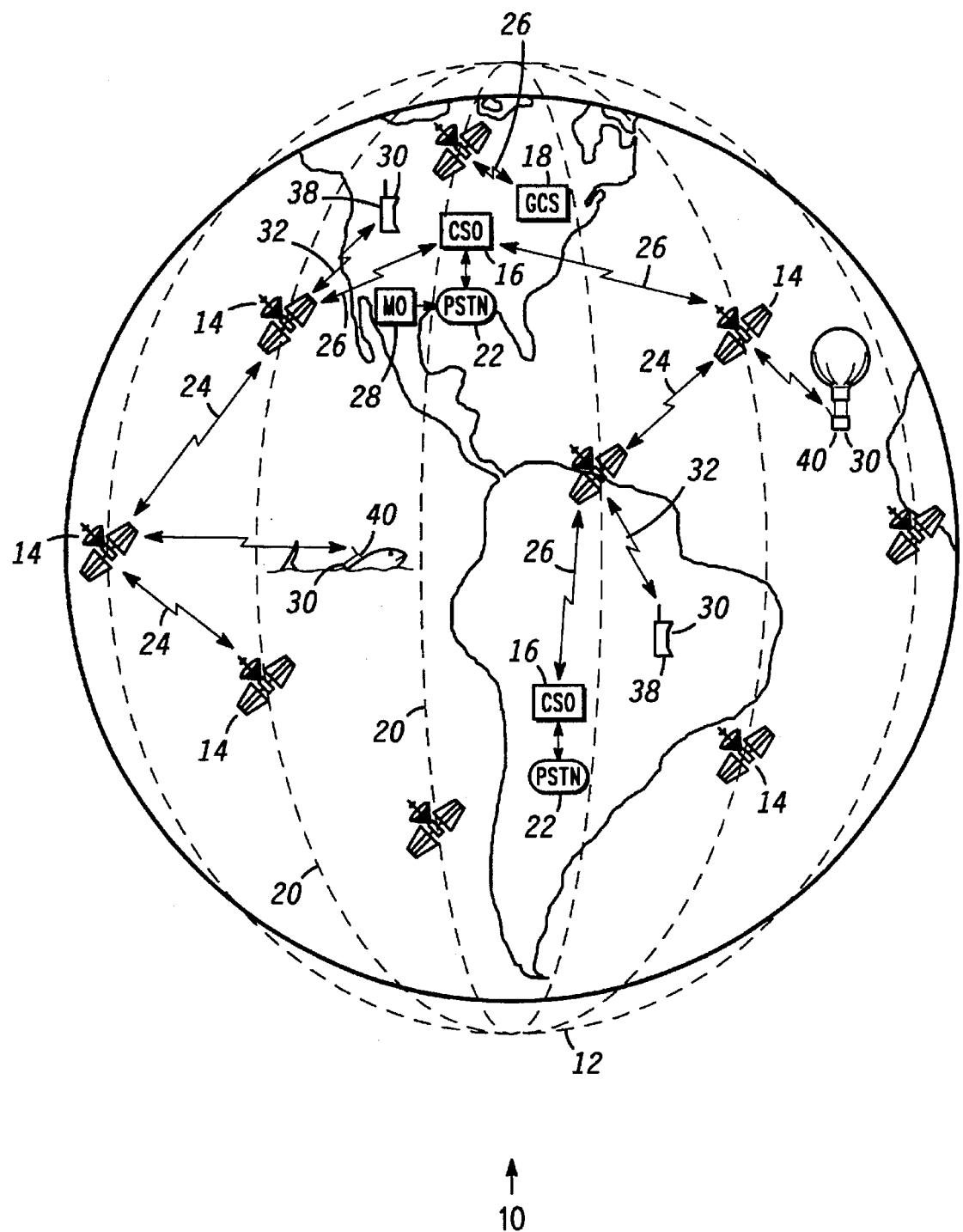
FIG. 1 shows an environment in which the present invention is practiced.

FIG. 1 illustrates an environment 10 within which preferred embodiments of the present invention are practiced. Environment 10 includes a satellite-based communication infrastructure, system, or network 12. Network 12 is dispersed over the earth through the use of several above-the-earth radio communication stations or nodes, such as orbiting satellites 14. Network 12 additionally includes devices or nodes on the ground that are in communication with satellites 14. In particular, satellites 14 communicate with many central switching offices (CSOs) 16, of which FIG. 1 shows only two, and a few ground control stations (GCSs) 18, of which FIG. 1 shows only one.

In the preferred embodiment, satellites 14 occupy substantially polar, low-earth orbits 20. The preferred embodiment of network 12 uses seven polar orbits, with each orbit holding eleven of satellites 14. For clarity, FIG. 1 illustrates only a few of these satellites 14. Orbits 20 and satellites 14 are distributed around the earth. In the preferred embodiment, each orbit 20 encircles the earth at an altitude of around 765 km. Due to these relatively low orbits 20, substantially line-of-sight electromagnetic transmissions from any one satellite 14 cover a relatively small area of the earth at any point in time. For example, when satellites 14 occupy orbits at around 765 km above the earth, such transmissions cover "footprint" areas around 4075 km in diameter. Moreover, due to the low-earth character of orbits 20, satellites 14 travel with respect to the earth at around 25,000 km/hr. This allows a satellite 14 to be within view of a point on the surface of the earth for a maximum period of around nine minutes. It also provides for a considerable Doppler shift in the frequencies of signals transmitted between a satellite as it approaches and recedes and a point on the surface of the earth.

While FIG. 1 and the above-presented discussion describe a preferred orbital geometry for satellites 14, those skilled in the art will appreciate that the communication nodes which satellites 14 provide need not be positioned precisely as described herein. For example, such nodes may be located on the surface of the earth or in orbits other than those described herein. Likewise, the precise number of nodes may vary from network to network.

CSOs 16 of network 12 are preferably distributed over the surface of the earth in accordance with geo-political boundaries. GCSs 18 preferably reside in extreme northern or southern latitudes, where the convergence of orbits 20 causes a greater number of satellites 14 to come within direct line-of-sight view of a single point on the surface of the earth when compared to more equatorial latitudes. Preferably, around four GCSs 18 are used so that all satellites 14 in the constellation may at some point in their orbits 20 come within direct view of their assigned GCS 18. Nothing prevents CSOs 16 and GCSs 18 from being located together on the ground. However, CSOs 16 serve a different function from that of GCSs 18. Preferably, CSOs 16 operate as communication nodes in network 12. Diverse terrestrial-based communications systems, such as the worldwide public switched telecommunications network (PSTN) 22, couple to CSOs 16 and may access network 12 through CSOs 16. GCSs 18 preferably perform telemetry, tracking, and control (TT&C) functions for the constellation of satellites 14.

Network 12 transports communications from one point to another. In particular, communications may be delivered between nearby satellites 14 via radiocommunication cross-links 24, and communications may be delivered between a CSO 16 or a GCS 18 and an overhead satellite 14 via a radiocommunication earth-link 26. Accordingly, any telecommunication device throughout the world may potentially use network 12 via a local PSTN 22 to transport communications. Such telecommunication devices include a modem-equipped, personal computer (not shown) located at a monitoring office (MO) 28. Those skilled in the art will appreciate that MO 28 may be located virtually anywhere and still be able to access network 12 via a PSTN 22.

Environment 10 additionally includes any number, potentially in the millions, of radiocommunication subscriber units 30. Units 30 primarily communicate directly with satellites 14 of network 12 via subscriber unit radiocommunication links 32. Subscriber units 30 may be located anywhere on the surface of the earth or in the atmosphere above the earth. Due to the configuration of the constellation of satellites 14 in the preferred embodiment, at least one of satellites 14 is within view of each point on the surface of the earth at all times. Accordingly, network 12 may establish a communication circuit through the constellation of satellites 14 between any two subscriber units 30, between any subscriber unit 30 and a MO 28, or between a MO 28 and any other telecommunication device coupled to a PSTN throughout the world.

Radiocommunication links 32, which the constellation of satellites 14 use in communicating with any and all of subscriber units 30, consume a limited amount of the electromagnetic spectrum. The precise parameters of this spectrum are unimportant to the present invention and may vary from network to network. The present invention divides this spectrum into discrete portions, hereinafter referred to as channel sets. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets. In other words, simultaneous communication may take place at a common location over every channel set without significant interference between the channel sets.

Figure 2:
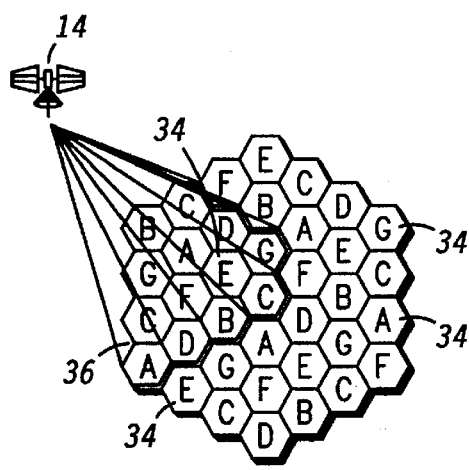
FIG. 2 shows an exemplary cellular pattern formed on the surface of the earth through the operation of satellite radio communication stations that serve as nodes in a communication system.

FIG. 2 shows a layout diagram of a cellular antenna pattern achieved by satellites 14. Each satellite 14 includes an array (not shown) of directional antennas. Each array projects numerous discrete antenna patterns on the earth's surface at numerous diverse angles away from its satellite 14. FIG. 2 shows a diagram of a resulting pattern of cells 34 that satellites 14 collectively form on the surface of the earth. A footprint region 36, which is bounded by a double line in FIG. 2, results from the antenna patterns produced by an antenna array of a single satellite 14. Cells 34 which reside outside of region 36 are produced by antenna arrays from other satellites 14.

The precise number of channel sets into which the spectrum used by satellites 14 is divided is not important to the present invention. FIG. 2 illustrates an exemplary assignment of channel sets to cells 34 in accordance with the present invention and in accordance with a division of the spectrum into seven discrete channel sets. FIG. 2 references the seven discrete channel sets through the use of the characters "A", "B", "C", "D", "E", "F" and "G". Those skilled in the art will appreciate that a different number of channel sets, for example twelve, may be used and that, if a different number is used the resulting assignment of channel sets to cells 34 will differ from the assignment pattern depicted in FIG. 2. Likewise, those skilled in the art will appreciate that each channel set may include one channel or any number of orthogonal channels therein. As illustrated in FIG. 2, the assignment of channel sets to cells 34 allows the limited spectrum to be reused in geographically spaced apart cells 34. In other words, non-orthogonal channel sets simultaneously carry communications without interference because the cells 34 where the non-orthogonal channel sets are used are spaced apart from one another. Moreover, each subscriber unit 30 is capable of operating with any of the discrete channel sets, and the particular channel set used at any particular time by any particular subscriber unit 30 is controlled by network 12.

With reference back to FIG. 1, at least two different types of subscriber units 30 are contemplated in accordance with the preferred embodiments of the present invention. A voice subscriber unit (VSU) 38 is preferably configured for human operation and for conveying voice communication, much like conventional telephony and cellular radiotelephony. Of course, those skilled in the art will appreciate that nothing prevents VSUs 38 from conveying data, as is common in accordance with conventional terrestrial telecommunications. While nothing requires any particular single VSU 38 to be located at any particular place on the earth, VSUs 38 are predominantly located in populated areas because humans are predominantly located in such areas.

A position determining unit (PDU) 40 represents another type of subscriber unit 30. PDUs 40 are preferably configured to convey data and to be operated without human intervention. In particular, the data a PDU 40 is configured to convey describe a location for the PDU 40, and may describe other environmental and non-location characteristics. While no single PDU 40 is required to be placed at any particular location on the earth, PDUs 40 may advantageously be located predominantly in unpopulated areas. Thus, the communications infrastructure provided by network 12 supports communication applications located in both populated and unpopulated areas, and the overall cost of the infrastructure needed to support both communication applications is reduced accordingly.

PDUs 40 are intended to be physically associated with mobile objects. To name a few examples, a PDU 40 may be attached to wild or domestic marine or land-based animals, to weather balloons, ocean buoys, railroad cars, freight trailers or containers, airplanes, ships, cars, and the like. Such mobile objects are regularly located in unpopulated areas or at least travel through unpopulated areas. As discussed below, a remotely located monitoring office (MO) 28 may receive location and other data concerning the object to which a PDU 40 is attached. In accordance with the preferred embodiments of the present invention, this remote position determining service is highly reliable, worldwide in scope, flexible, and may be provided at a reasonable cost.

Figure 3:
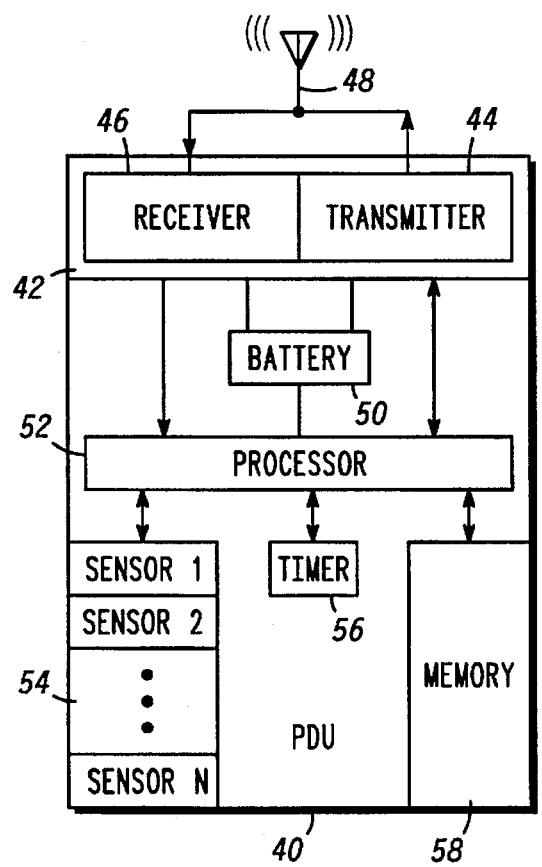
FIG. 3 shows a block diagram of a position determining unit (PDU) which communicates through the communication system.

FIG. 3 shows a block diagram of a PDU 40. Preferably, all PDUs 40 within environment 10 (see FIG. 1) are substantially described by the block diagram of FIG. 3. PDU 40 includes a communication network transceiver 42, which includes a transmitter 44 and a receiver 46. Transmitter 44 and receiver 46 transmit and receive signals in a format compatible with satellites 14 and link 32 (see FIG. 1). These signals include data messages which allow PDU 40 to be in data communication with a nearby satellite 14. Through this satellite 14, PDU 40 is also in data communication with any other node of network 12, and with a MO 28 (see FIG. 1). Preferably, transmitter 44 and receiver 46 utilize a single antenna 48.

Transmitter 44 and receiver 46 both couple to a battery section 50 and to a processor 52. Processor 52 additionally couples to battery section 50 to selectively control the application of electrical power to transmitter 44, receiver 46, and other sections of PDU 40. Processor 52 additionally couples to a sensor section 54, a timer 56, and a memory 58. Processor 52 uses various sensors from sensor section 54 to monitor the environment near PDU 40, including parameters related to the object to which PDU 40 may be attached. For example, sensor section 54 may allow processor 52 to obtain data describing temperature, pressure, heartbeat, respiration rate, ambient light, humidity, and the like. Processor 52 uses timer 56 to maintain the current date and time. Memory 58 includes data which serve as instructions to processor 52 and which, when executed by processor 52 cause PDU 40 to carry out procedures which are discussed below. In addition, memory 58 includes variables, tables, and databases that are manipulated due to the operation of PDU 40.

A VSU 38 (see FIG. 1) may be configured similar to the block diagram shown in FIG. 3. However, VSU 38 may omit sensor section 54 and incorporate an I/O section that, among other features, translates audio into electrical signals, and vice-versa, and that allows a user to input keystrokes to instruct VSU 38 about the identity of parties being called.

Figure 4:
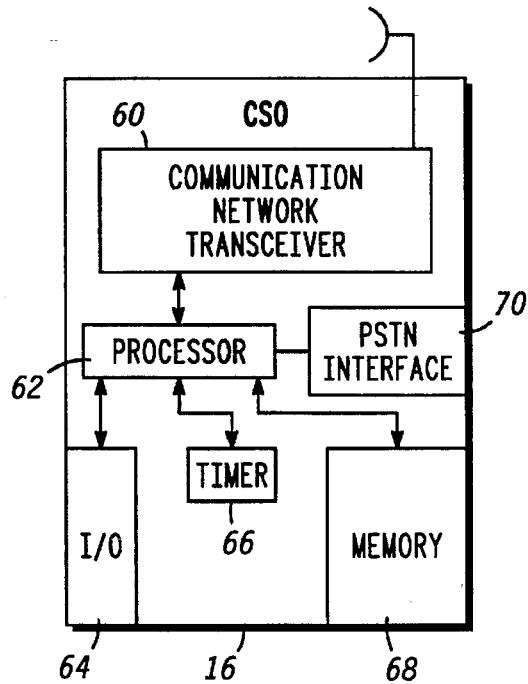
FIG. 4 shows a block diagram of a central switching office (CSO) which serves as a node in the communication system.

FIG. 4 shows a block diagram of a CSO 16. Preferably, all CSOs 16 within environment 10 (see FIG. 1) are substantially described by the block diagram of FIG. 4. CSO 16 includes a transceiver 60 which transmits and receives signals in a format compatible with satellites 14 and earthlinks 26 (see FIG. 1). These signals carry data messages which allow CSO 16 to communicate with a nearby satellite 14, with subscriber units 30 (see FIG. 1) that the CSO 16 is currently serving, with other CSOs 16 that the CSO 16 may be cooperating with in setting up a call, or with any other node within network 12. Transceiver 60 couples to a processor 62. Processor 62 also couples to an I/O section 64, a timer 66, a memory 68, and a PSTN interface 70. I/O section 64 receives input from keyboards and other input devices and provides data to display terminals, printers, and other output devices. Processor 62 uses timer 66 to maintain the current date and time. Memory 68 includes semiconductor, magnetic, and other storage devices for storing data that serve as instructions to processor 62 and which, when executed by processor 62, cause CSO 16 to carry out procedures which are discussed below. In addition, memory 68 includes variables, tables, and databases that are manipulated due to the operation of CSO 16. Through interface 70, CSO 16 communicates with the PSTN 22.

Figure 5:
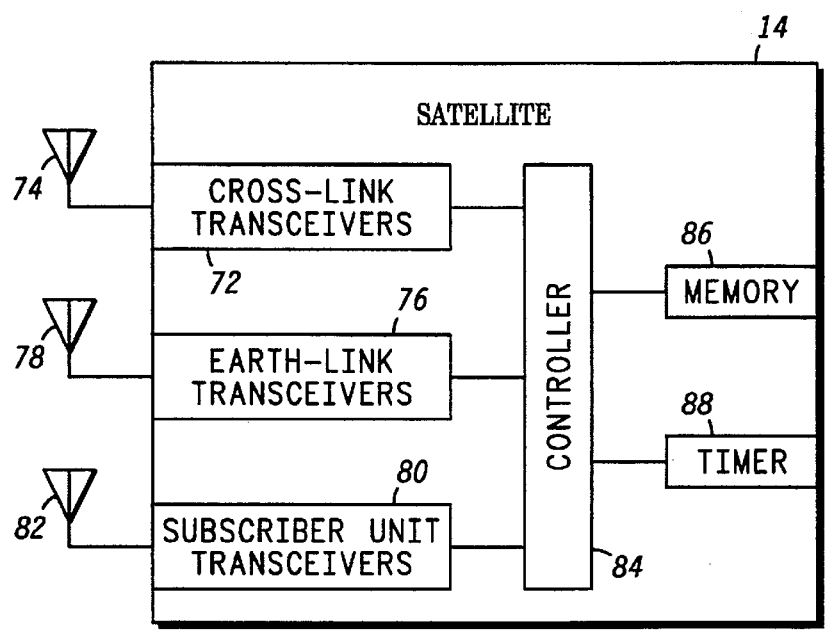
FIG. 5 shows a block diagram of a satellite radio communication station.

FIG. 5 shows a block diagram of a radio communication station provided by a satellite 14. Preferably, all satellites 14 within environment 10 (see FIG. 1) are substantially described by the block diagram of FIG. 5. Satellite 14 includes cross-link transceivers 72 and associated antennas 74. Transceivers 72 and antennas 74 support cross-links 24 (see FIG. 1) to other nearby satellites 14. Earth-link transceivers 76 and associated antennas 78 support earth-links 26 (see FIG. 1). Moreover, subscriber unit transceivers 80 and associated antennas 82 support subscriber links 32 (see FIG. 1). Preferably, each satellite 14 may simultaneously support a link 32 for up to a thousand or more of subscriber units 30 (see FIG. 1). Of course, those skilled in the art will appreciate that antennas 74, 78, and 82 may be implemented either as single multi-directional antennas or as banks of discrete antennas.

A controller 84 couples to each of transceivers 72, 76, and 80 as well as to a memory 86 and a timer 88. Controller 84 may be implemented using one or more processors. Controller 84 uses timer 88 to maintain the current date and time. Preferably, timer 88 is synchronized with "system time" from time-to-time through communications with GCSs 18 (see FIG. 1). Hence, all satellites 14 within network 12 recognize the same absolute point in time at substantially the same instant. Memory 86 stores data that serve as instructions to controller 84 and that, when executed by controller 84 cause satellite 14 to carry out procedures which are discussed below. In addition, memory 86 includes variables, tables, and databases that are manipulated due to the operation of satellite 14.

Figure 6:
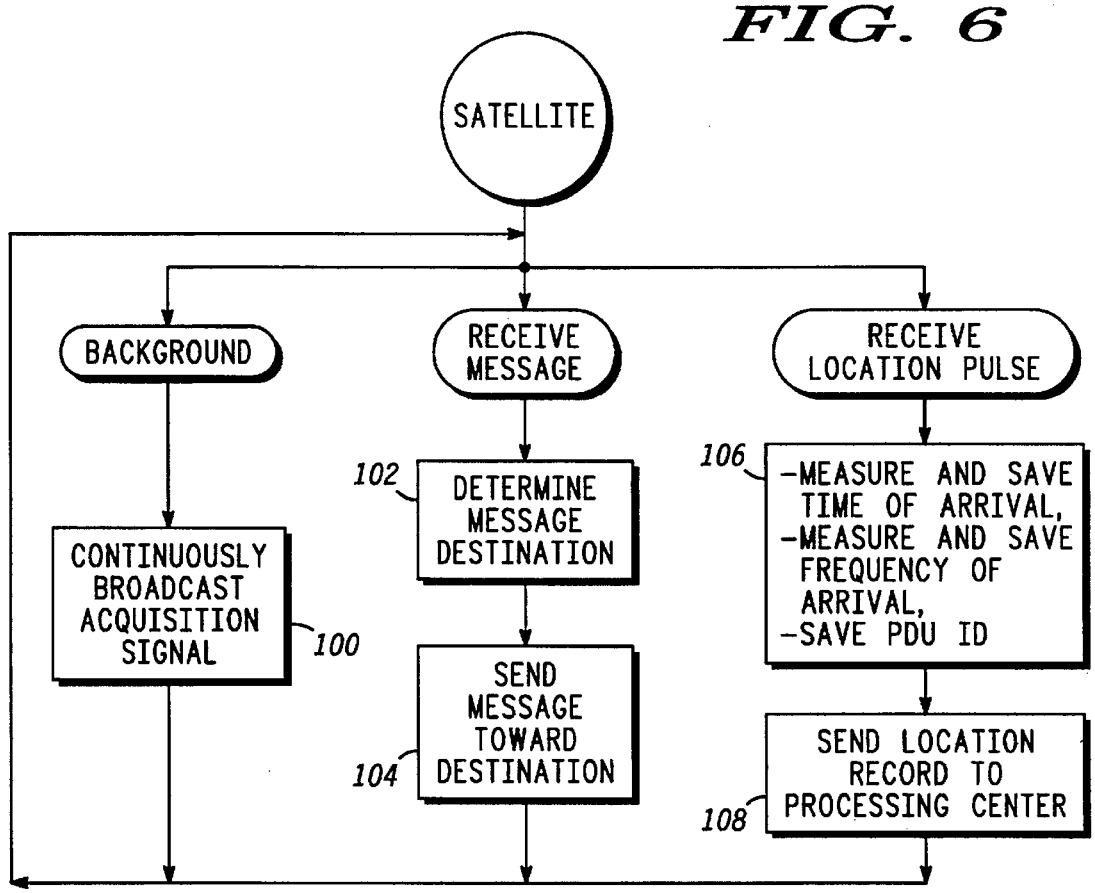
FIG. 6 shows a flow chart of tasks performed by a satellite radio communication station.
Figure 7:
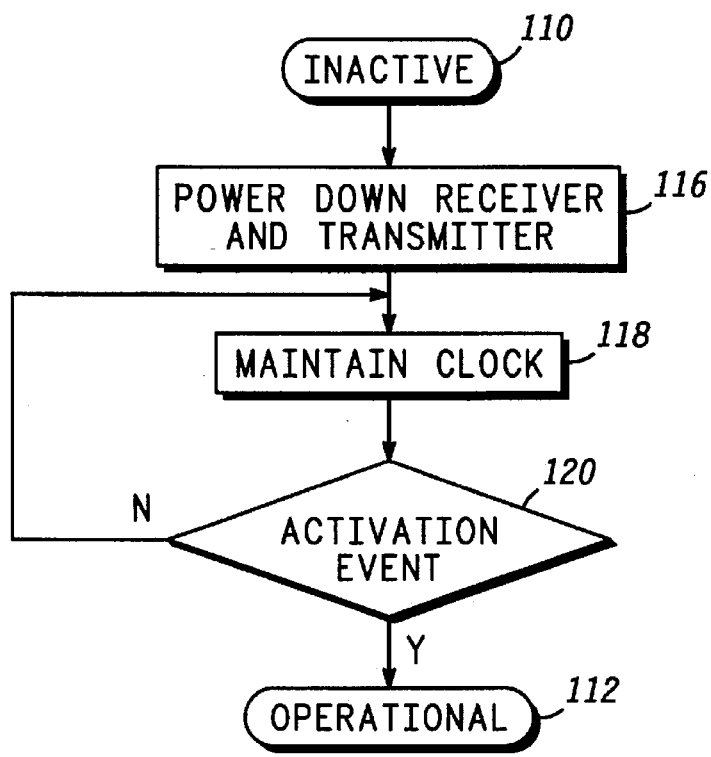
FIG. 7 shows a flow chart of tasks performed by a PDU while operating in an inactive mode.
Figure 8:
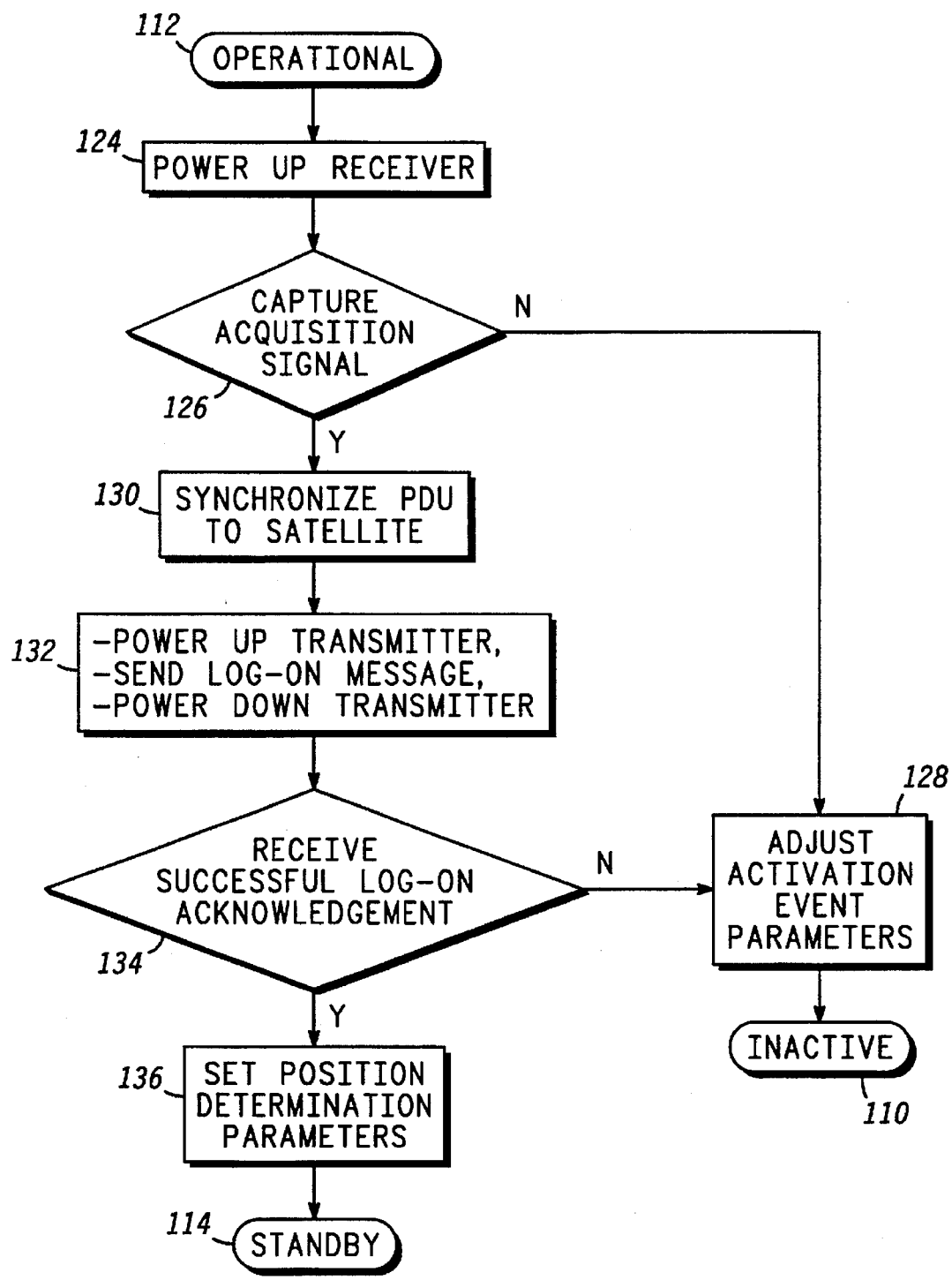
FIG. 8 shows a flow chart of tasks performed by a PDU while operating in a operational mode.
Figure 9:
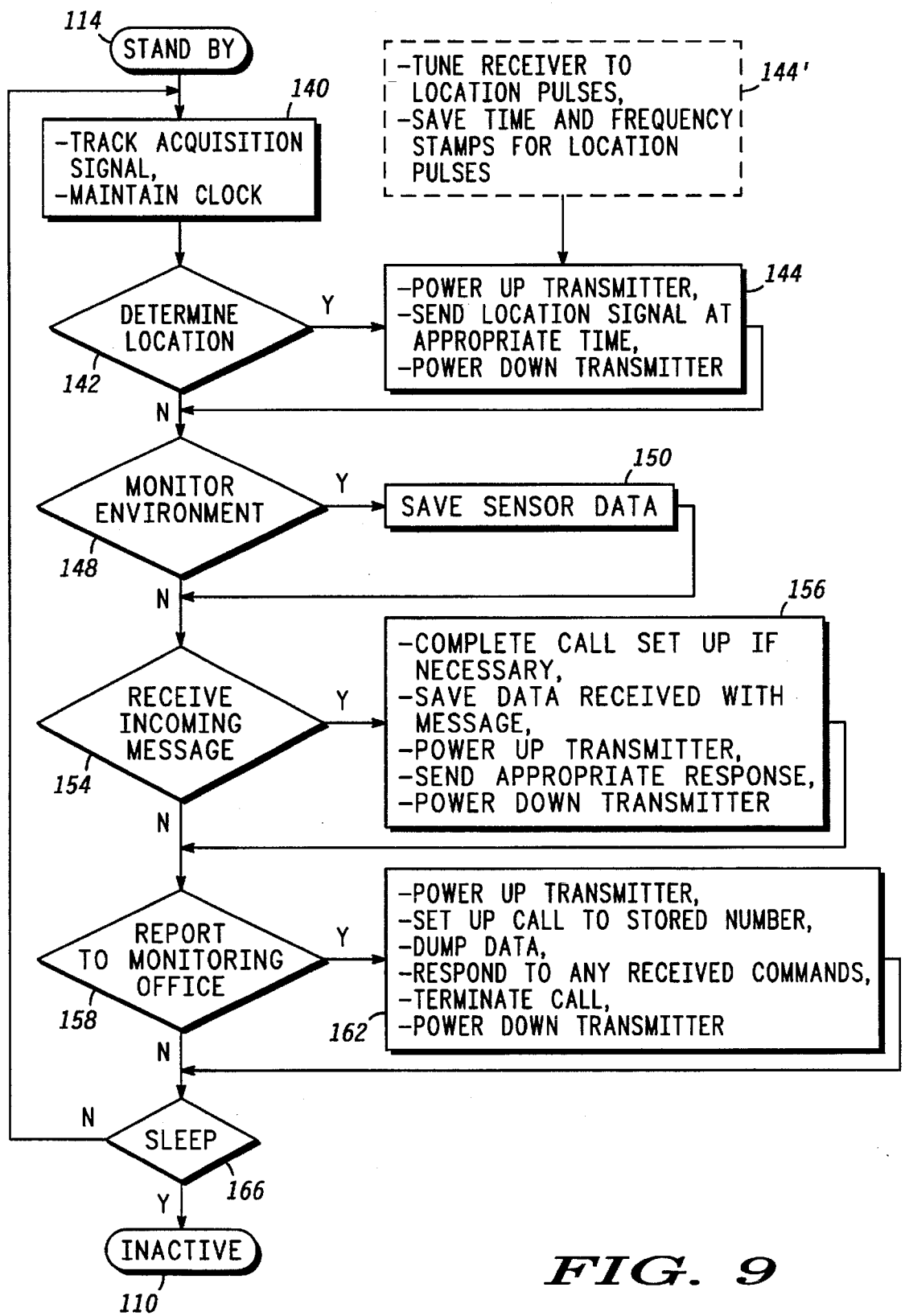
FIG. 9 shows a flow chart of tasks performed by a PDU while operating in a standby mode.
Figure 11:
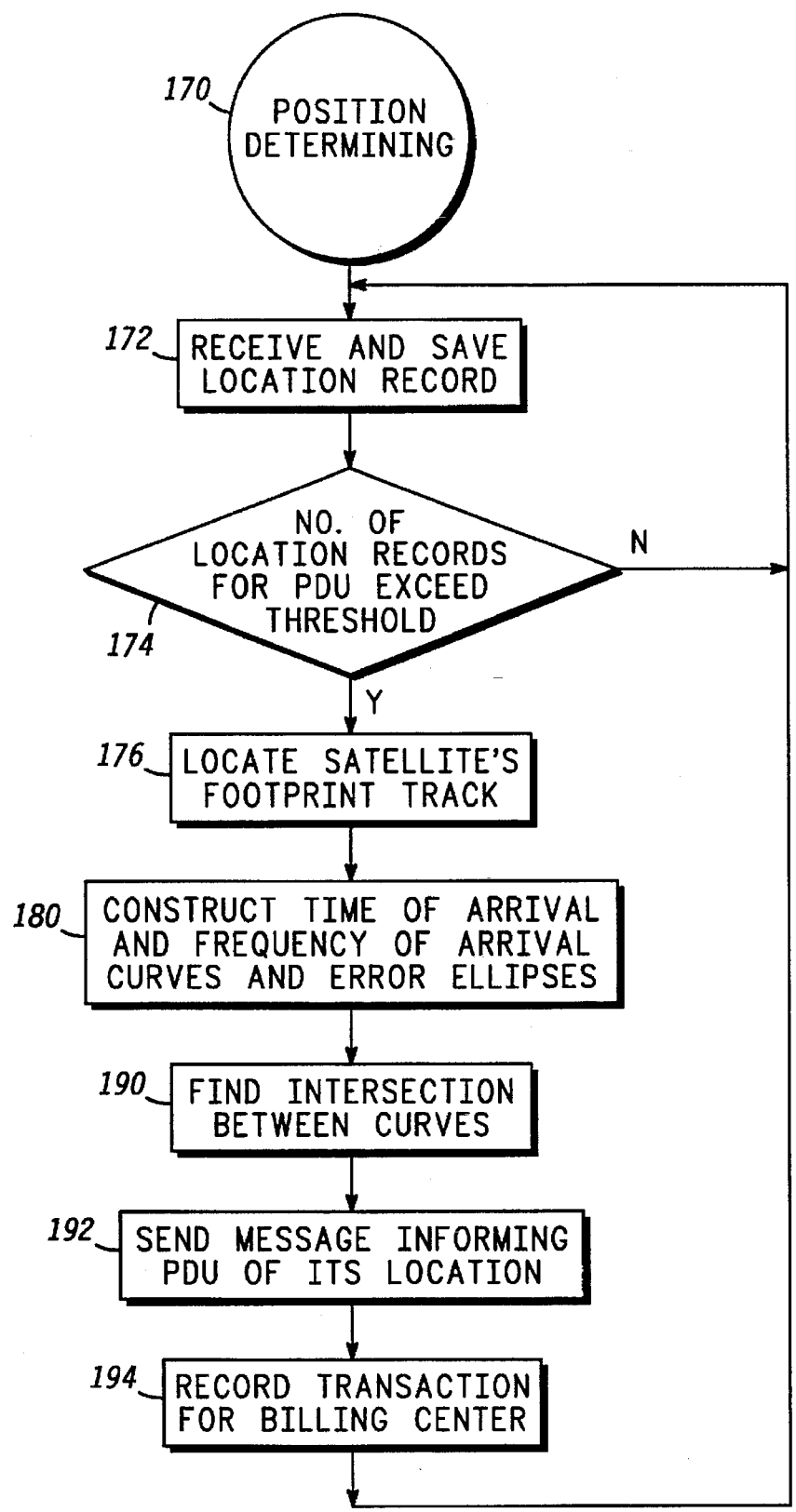
FIG. 11 shows a flow chart of tasks performed by a processing center to determine positions.

FIGS. 6–9 and 11 show flow charts of procedures which are used to support position determination and reporting of position in accordance with preferred embodiments of the present invention. FIG. 6 illustrates a few procedures which are performed by satellites 14 in accordance with a preferred embodiment of the present invention. FIGS. 7–9 illustrate procedures performed by PDUs 40, and FIG. 11 illustrates a procedure performed by a processing center, which in a preferred embodiment may be provided by CSOs 16.

With reference to FIG. 6, satellites 14 perform a task 100, suggested as being a background task in FIG. 6, to transmit an acquisition signal. The acquisition signal is continuously or repetitiously broadcast over predetermined channels within each channel set. This acquisition signal allows PDUs 40 to determine how to communicate through network 12, as discussed below, and serves a role in coordinating a multiplicity of simultaneous and independent communications supported by network 12. The acquisition signal may convey a limited amount of data to subscriber units 30, such as the identity of the satellite 14 broadcasting the acquisition signal, the satellite's version of system time, and the identity of the cell 34 (see FIG. 2) to which the acquisition signal is directed.

In one preferred embodiment of the present invention, referred to hereinafter as a local position determining embodiment, the acquisition signal may convey the geolocation of the center of the cell 34 to which the acquisition signal is directed, and a predetermined stream of location pulses which may be used by subscriber unit 30 to obtain location-determining data. In accordance with this local position determining embodiment, PDU's 40 either determine their own locations or collect sufficient data so that their locations may be calculated later at a remote processing center, such as a MO 28.

Satellites 14 act substantially as repeaters within network 12 (see FIG. 1). In other words, most messages received at one of a satellite's receivers are re-transmitted from the satellite. Satellites 14 perform a Receive Message procedure when they receive messages. In this context, messages may be any data whatsoever, whether voice communications, data communications, or overhead control data used for call setup, call termination, call handoff, call management, call billing, or other control messages. As shown in FIG. 6, a task 102 examines data communicated by or associated with a received message to determine the destination for the message. After task 102, a task 104 sends the message on toward its destination by writing the message to an appropriate buffer (not shown) associated with a transmitter that will transmit the message toward its destination.

In another preferred embodiment of the present invention, referred to hereinafter as a remote position determining embodiment, satellites 14 perform a Receive Location Pulse procedure to support the determination of positions for PDU's 40. In this remote position determining embodiment, PDUs 40, not satellites 14, transmit location pulses in accordance with a predetermined schedule. Since satellites 14 move at high speed with respect to PDUs 40, PDUs 40 may be viewed as being relatively stationary. This satellite movement allows one location pulse to be received when a satellite 14 is in one position in the sky while another location pulse is received when the satellite 14 is in a substantially different position in the sky. Due to this movement, the Doppler shift of the received location pulses and the propagation delay of the received location pulses change. As discussed below in connection with FIGS. 11–12, these timing and Doppler characteristics allow positions of PDUs 40 to be determined.

Satellites 14 perform the Receive Location Pulse procedure whenever a location pulse is received. A task 106 measures the time of arrival and frequency of arrival for the location pulse and saves data describing these parameters along with data describing the identity of the PDUs 40 sending the location pulses. For each PDU 40 transmitting location pulses, such data are collected in a location record. A task 108 eventually sends the location record to a processing center, which is preferably, but not necessarily, a nearby CSO 16 (see FIG. 1). Accordingly, in the remote position determining embodiment of the present invention, satellites 14 measure and collect data which are used by a processing center to determine location.

FIGS. 7–9 show flow charts of various procedures performed by PDUs 40. In particular, FIG. 7 shows a flow chart of an Inactive procedure 110, which a PDU 40 performs when it is in a very low power, inactive mode of operation. FIG. 8 shows a flow chart of an Operational procedure 112, which a PDU 40 performs when it wakes-up from the inactive mode of operation. FIG. 9 shows a flow chart of a Standby procedure 114 which a PDU 40 performs after it completes Operational procedure 112 and has registered with network 12 (see FIG. 1).

With reference to FIG. 7, when Inactive procedure 110 is first entered, a task 116 is performed to power down transmitter 44 and receiver 46, (see FIG. 3) and all other non-essential circuits within PDU 40. Of course, those skilled in the art will appreciate that task 116 does not require transmitter 44, for example, to be powered up prior to performing task 116. Rather, task 116 simply insures that transmitter 44 is powered down. Task 116 is performed when processor 52 sends appropriate controlling commands to battery section 50 (see FIG. 3) so that battery power is not coupled to transmitter 44, receiver 46, or other non-essential circuits. Preferably, battery power remains coupled to processor 52, and at least a portion of memory 58. In addition, battery power remains coupled to at least a portion of sensor section 54 and/or timer 56. Thus, in the inactive mode of operation, PDU 40 remains sufficiently energized so that it can autonomously determine when to exit the inactive mode of operation.

After task 116, a task 118 maintains a time-of-day and date clock for PDU 40. After task 118, a query task 120 determines whether an activation event has occurred. An activation event is an event that will cause PDU 40 to exit its inactive mode of operation. Several events may qualify as activation events, and these events are preferably remotely programmable via data received through network 12.

FIG. 10 shows a block diagram of exemplary memory structures maintained within memory 58 of PDU 40 (see FIG. 3). One memory structure is a table 122 of activation events. Task 120 compares its internal clock and/or values observed at various sensors within sensor section 54 (see FIG. 3) to data programmed in table 122. For example, table 122 may indicate that activation should occur at a particular date and time. Task 120 would then determine whether its internal clock indicates that particular date and time has occurred. Table 122 may additionally specify that activation events should occur at regular specified intervals thereafter. Alternatively, table 122 may specify that one or more of the sensors within sensor section 54 (see FIG. 3) should read a particular value to initiate activation. For example, a sensor which indicates when a marine mammal is on the surface of the ocean may be used as an activation event. Of course, those skilled in the art will appreciate that table 122 may be programmed so that specified potential activation events may be combined by ANDing or ORing, and that table 122 may be programmed so that other potential activation events are ignored at task 120.

Table 122 supports flexibility, low cost, and reliability. In particular, flexibility is enhanced because table 122 may be programmed to achieve whatever level of position determination and reporting is desired. Low cost is enhanced because table 122 may be programmed to minimize position determination and position reporting services so that unneeded services are not purchased by the subscriber. Reliability is enhanced because PDUs 40 can be programmed so that they remain inactive for as much time as possible, and so that they become active only when valuable data may be collected or only when likely chances of determining and/or reporting the location data exist. This conserves battery power to extend the life of PDU 40.

With reference back to FIG. 7, when task 120 determines that no activation event has occurred, then program control simply returns to task 118, and PDU 40 remains in the inactive mode of operation. On the other hand, when task 120 determines that an activation event has occurred, then program control for PDU 40 proceeds to Operational procedure 112.

FIG. 8 shows a flow chart for Operational procedure 112. Upon entering procedure 112, a task 124 is performed to energize or power up receiver 46 (see FIG. 3) of PDU 40. By powering up receiver 46, PDU 40 begins to consume an increasing amount of electrical energy. However, PDU 40 may also begin to perform tasks which have a high likelihood of being valuable to remote position determination.

In particular, receiver 46 may now begin to receive, capture or synchronize to an acquisition signal broadcast by an overhead satellite 14 (see task 100, FIG. 6). An acquisition signal may be considered captured when PDU 40 can read valid data carried by the acquisition signal. Due to variations in Doppler and propagation time of the acquisition signal, receiver 46 may need to search for some period of time before it can lock onto an acquisition signal. In addition, receiver 46 may need to discriminate between acquisition signals associated with more than one of cells 34 (see FIG. 2). Accordingly, after an appropriate period of time, a query task 126 determines whether the acquisition signal has been captured.

A PDU 40 may fail to capture an acquisition signal for any one of several reasons. For example, a PDU 40 may be underwater, underground, within a building, or near some interfering structure. When task 126 determines that PDU 40 has failed to capture an acquisition signal, a task 128 adjusts the activation event parameters programmed in table 122 (see FIG. 10), and program control returns to Inactive procedure 110, discussed above in connection with FIG. 7. The activation event parameters may be adjusted, for example, by altering a wake-up time parameter so that PDU 40 will again try to capture an acquisition signal at some future point in time. Such a future point in time, or the duration between the present time and such a future point in time, may be programmed in table 122.

Accordingly, when an acquisition signal cannot be acquired, PDU 40 goes inactive to minimize the consumption of power until a new activation event occurs. The new activation event may, but need not, be the occurrence of a predetermined future point in time. PDU 40 uses the capture of the acquisition signal as a predictor of future success in being able to determine position and/or report that position to MO 28 (see FIG. 1). When the acquisition signal cannot be captured, PDU 40 goes inactive to conserve power rather than to continue operations that have a low probability of producing valuable data.

When task 126 determines that an acquisition signal has been captured, PDU 40 may conclude that a good likelihood exists for being able to determine position and/or report that position. Consequently, a task 130 adjusts parameters of transceiver 42 (see FIG. 3) to synchronize or otherwise coordinate communication with the satellite 14 whose acquisition signal has been captured. This synchronization, which occurs in response to receiving an acquisition signal, allows the spectrum managed by network 12 (see FIG. 1) to be used most efficiently. In other words, due to the coordination of communications between satellites 14 and subscriber units 30 (see FIG. 1), the volume of communications passing through satellites 14 may be maximized, and the cost to each subscriber of the communications infrastructure which supports position determination and other communications may be reduced.

Figure 12:
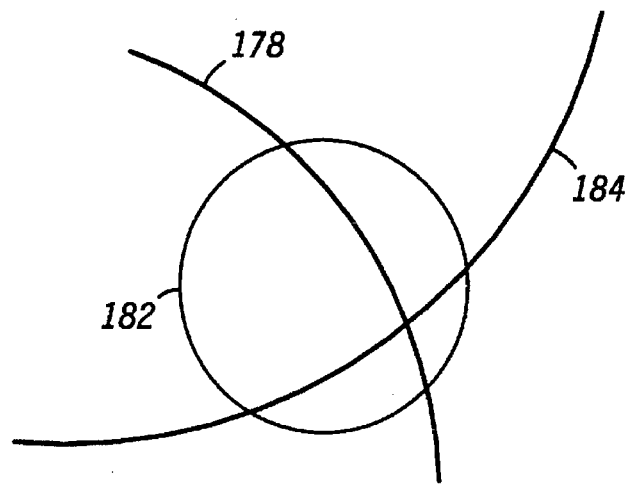
FIG. 12 graphically illustrates one embodiment of a process useable to determine positions of PDUs.

After task 130, a task 132 energizes transmitter 44 (see FIG. 3) and transmits a log-on message to network 12 (see FIG. 12). The log-on message preferably includes a unique identification number associated with the PDU 40 sending the message. Network 12, and particularly a nearby CSO 16 thereof, interprets the log-on message as a request for registering the identified PDU 40 to obtain position determination or communication services from network 12. Preferably, task 132 powers down transmitter 44 of PDU 40 as soon as the message has been transmitted. Those skilled in the art will appreciate that the energization of transmitter 44 causes PDU 40 to consume a considerable amount of energy. However, transmitter 44 needs to be activated for only a very short period of time to transmit a log-on message. Hence only a relatively small power drain results.

The particular processes used by network 12 to determine whether to register PDU 40 and how to accomplish registration of a PDU 40 are not important to the present invention. Network 12 responds to the log-on message by returning an acknowledgement message which indicates whether network 12 has registered the PDU 40 to receive services. After task 132, PDU 40 performs a query task 134 to determine whether a successful log-on acknowledgement message has been received. Task 134 may be performed by tuning receiver 46 (see FIG. 3) to a particular channel which will broadcast messages for receipt by subscriber units 30 (see FIG. 1). The acknowledgement message will be addressed to particular PDUs 40 by including identification numbers for the particular PDUs.

If task 134 determines that no successful log-on acknowledgement has been received, program control proceeds to task 128 to revise activation event parameters and then enter the inactive mode of operation. Network 12 may refuse registration for any one of several reasons. For example, higher priority communication traffic may currently have network 12 saturated, or the subscriber for the particular PDU 40 requesting registration may have failed to pay bills for past services. In these and other situations, task 128 may go inactive by returning to procedure 110 to conserve power and wake-up at some future date to try to access network 12 again. By going inactive, the battery life and the future usefulness of PDU 40 is extended.

When task 134 determines that a successful log-on acknowledgement has been received, a task 136 sets position determination parameters in accordance with any data included with the acknowledgement. By setting position determination parameters, PDU 40 becomes programmed to operate using particular parameters which will achieve best results for network 12. For example, in the remote position determination embodiment of the present invention discussed above, such parameters may specify a particular frequency channel and time slot to use in transmitting location pulses that will be received at satellite 14, as discussed above in connection with tasks 106–108 (see FIG. 6). In addition, such parameters may specify a particular duration for spacing apart location pulses. In the preferred embodiment, this duration is around five seconds, but this value may be increased or decreased depending on the application. Task 136 sets the position determination parameters by writing appropriate data to memory 58 of PDU 40, and particularly to a position determination parameter table 138 (see FIG. 10) stored therein. After task 136, PDU 40 has determined that success in engaging in position determination and other activities is likely, and program control proceeds to Standby procedure 114.

FIG. 9 presents a flow chart of Standby procedure 114. Upon entering procedure 114, PDU 40 may perform some background activities in a task 140, such as continuing to track the acquisition signal which was captured above in task 126 (see FIG. 8) and maintaining its internal clock. After task 140, a query task 142 determines if PDU 40 needs to engage in position determination activities through cooperative communications with network 12. This is a programmable parameter which will normally be set to indicate that position determination activities are required.

To engage in position determination activities, PDU 40 performs a task 144, which is configured to inform network 12, either directly or indirectly through cooperative communications with network 12, of the location of PDU 40. In the present context, cooperative communications refers to communications in which one party transmits information that, by prior arrangement, the other party can interpret to determine position. In particular, in the remote position determining embodiment of the present invention, task 144 transmits location pulses at the appropriate times. The appropriate times may have been set in accordance with task 136 (see FIG. 8). Preferably, transmitter 44 is energized as late as possible to meet the timing considerations of the location pulse and is de-energized as soon as possible after the location pulse has been transmitted to minimize power consumption. Standby procedure 114 is performed in a loop, so task 144 is performed repetitively to transmit any number of pulses.

In accordance with the above-discussed local position determining embodiment of the present invention, an alternate task 144', shown in phantom in FIG. 9, may be performed rather than the above discussed task 144. In the local position determining embodiment, PDU 40 determines, or at least collects data to support determination of, its location. Thus, during task 144', PDU 40 tunes its receiver 46 (see FIG. 3) to a channel that broadcasts location pulses from an overhead satellite 14, then measures and saves time and frequency stamps for the location pulses. The time and frequency stamps may be saved in a data log table 146 (see FIG. 10) of memory 58 (see FIG. 3). In other words, task 144' performs substantially the same tasks discussed above in connection with task 106 (see FIG. 6).

After task 144 or 144', or when task 142 determines that no location determination activities are needed, procedure 114 performs a query task 148 to determine whether any monitoring of the environment is needed. This determination may be made by examining a programmable parameter in memory 58 (see FIG. 3). If environment monitoring is requested, then a task 150 may energize appropriate sensors, if needed, obtain data from various sensors of sensor section 54, and save the sensor data. The sensor data may be saved in data log table 146 (see FIG. 10).

After task 150 or when task 148 determines that no environment monitoring is needed, procedure 114 performs a query task 154. Task 154 determines whether receiver 46 (see FIG. 3) has detected an incoming message from network 12 addressed to PDU 40. The incoming message may indicate that an incoming call is being set up or that network 12 is attempting to communicate with PDU 40 regarding position location activities.

When task 154 detects an incoming message, a task 156 is performed. If the incoming message indicates an incoming call, then task 156 may take whatever actions are needed to complete call set up. Such actions are not important to the present invention, but may include activities that amount to "answering" the call or going "off-hook", as is conventional in telephony. If the message itself is accompanied with data, then task 156 may save the data in memory 58. Data that might accompany a message may include, for example, latitude and longitude geolocation data. Such geolocation data may be calculated by a processing center in connection with the remote position determining embodiment of the present invention. Such location data can be saved in data log table 146 (see FIG. 10).

Data received in a call may be interpreted as a command or instruction to PDU 40 to take some predetermined action, and task 156 takes the indicated action. For example, such commands or instructions may cause task 156 to save programming data received with the command from a calling party via network 12 in memory 58. As discussed above, such programming data include data describing predetermined conditions to be met prior to PDU 40 becoming operational from its inactive mode. Likewise, a command may cause PDU 40 to power up its transmitter 44 (see FIG. 3), and transmit an appropriate response to a calling party via network 12. The response may include data saved in data log table 146 (see FIG. 10). Thus, an incoming call may be used to obtain location data and/or non-location, environmental data. Responding data may describe other operational parameters. For example, such data may inform the calling party of the current frequency, time slot, and/or other operational parameters being used by PDU 40 to communicate through network 12. That way, a separate directional homing receiver may be tuned to the indicated operational parameters to pin-point a location for PDU 40 so that PDU 40 may be physically obtained. Alternatively, such returned data may describe the battery status of PDU 40 or current programming for PDU 40. Preferably, task 156 powers down transmitter 44 as soon as possible after any transmission to minimize power drain.

After task 156 or when task 154 determines that no incoming message has been received, a task 158 determines whether to enter a call-in operational mode. In the call-in mode, PDU 40 makes an outgoing call through network 12 to report its geolocation and respond to any commands that may be issued to it. The events which signal when to enter the call-in mode of operation may be programmed through event parameters stored in a call-in event table 160 (see FIG. 10) stored in memory 58 (see FIG. 3). These event parameters operate similarly to the activation event parameters discussed above in connection with table 122. In addition, such call-in event parameters may be configured to signal a call-in event upon the completion of other activities, such as position determination activities. In other words, table 160 may be configured so that task 158 declares a call-in event after the PDU's position has been determined to a given degree of precision, after a predetermined quantity of time and frequency stamp data has been collected, or upon the occurrence of any other desirable event. Those skilled in the art will appreciate that location determination and location reporting need not occur at the same time. For example, a PDU 40 may be programmed to cycle between numerous inactive and operational modes of operation to collect numerous points of data for geolocation and/or environment monitoring, for each call-in cycle. The call-in cycle may be, if desired, programmed to occur at a time when communication service rates are expected to be lowest.

When task 158 determines that a call-in event has occurred, a task 162 manages the call. In particular, task 162 powers up transmitter 44 and sets up a call through network 12. As discussed above, in the preferred embodiments of the present invention a call may be placed to any phone number via network 12 and PSTNs 22 coupled thereto. However, PDU 40 preferably places a call to a MO 28 that may be expecting such calls. The phone number of MO 28 is a programmable parameter 164 (see FIG. 10) stored in memory 58 (see FIG. 3). When the call is set up, PDU 40 reports its geolocation, as determined by data stored in data log table 146 (see FIG. 10) and responds to any commands issued by MO 28, including the dumping of environmental data and the storing of new programming parameters. Accordingly, task 162 operates in a manner similar to that described above for task 156. When communications with MO 28 are completed, task 162 terminates the call and powers down transmitter 44.

After task 162 or when task 158 determines that no call-in event has occurred, a query task 166 determines whether PDU 40 should "go to sleep." In other words, task 166 determines whether to exit the standby mode and return to the inactive mode. The determination made by task 166 may be made by examining a sleep event table 168 (see FIG. 10) stored in memory 58 (see FIG. 3). As discussed above in connection with tables 122 and 160 (see FIG. 10), table 168 stores data that define events. Such events may be based on time, on sensor readings, or on the completion of other events, such as performance of tasks 144 or 162. When task 166 determines that PDU 40 should remain in its standby mode of operation, program control returns to task 140, discussed above. When task 166 determines that PDU 40 should enter its inactive mode, program control returns to Inactive procedure 110, discussed above in connection with FIG. 7.

The standby mode of operation allows PDU 40 to engage in activities that lead to the determination of its geolocation, to monitor its environment, and to communicate with network 12 and MO 28. The programmable nature of PDU 40 provides great flexibility in the frequency and other conditions that cause PDU 40 to determine its position and collect environmental data. Moreover, the communication opportunities with MO 28 allow this programming to change when PDU 40 is in the field. In particular, an entire plan for determining position and monitoring the environment may be changed as needed by MO 28 in response to previously reported data or in response to other circumstances that have nothing to do with PDU 40. Moreover, the programmability of PDU 40 allows the cost of services used in determining position and reporting position to be tailored to those services minimally necessary to serve the needs of MO 28. Consequently, many low cost remote position determining applications are supported by the present invention.

FIG. 11 shows a flow chart of a position determining procedure 170. In the remote position determining embodiment of the present invention, procedure 170 may be performed at a CSO 16 (see FIG. 1), however the precise location is not an important factor. In the local position determining embodiment, this procedure may be performed at PDU 40 or at MO 28.

Procedure 170 operates upon the time-of-arrival and frequency-of-arrival tags recorded in response to the receipt of location pulses. These tags were discussed above in connection with tasks 106–108 (see FIG. 6) and task 144' (see FIG. 9). The tags are associated in data records, with one record describing a single location pulse with respect to a single PDU 40. Procedure 170 performs a task 172, if necessary, to receive and save location records. Task 172 is performed when a CSO 16 or a MO 28 serves as a processing center. After location records have been saved, a query task 174 determines whether the number of location records for any particular PDU 40 exceeds a predetermined threshold. At least one record is needed to begin to resolve a PDU's geolocation, with additional records being useful in resolving geolocation to greater and greater degrees of precision. Different applications can require the calculation of geolocation to different degrees of precision. So long as an insufficient number of location records are available, program control loops back to task 172 to collect additional location records.

When task 174 determines that a sufficient number of geolocation records are present to begin geolocation calculations for a particular PDU 40, a task 176 locates the cellular area of the satellite 14 used in forming the location records. In other words, the area on the surface of the earth that is covered by the cells 34 (see FIG. 2) during the times indicated in the records' time-of-arrival tags is determined. This area may be determined by consulting a table (not shown) which defines the satellite's orbital geometry with respect to time. Orbits 20 (see FIG. 1) are relatively stable, and by knowing characteristics of an orbit 20 and the antennas 82 (see FIG. 5) on satellite 14, the cellular area of coverage is unambiguously determined given the parameter of time from the location records.

FIG. 12 shows a graphical representation of calculations used in determining geolocation. The boundary for a cell 34

(see FIG. 2) is illustrated by a curve 178 in FIG. 12. Curve 178 is overlaid on a map that may, for example, have latitude and longitude coordinates. FIG. 12 shows only one curve 178 for clarity, but those skilled in the art will appreciate that multiple curves 178 may be overlaid on a map to correspond to multiple geolocation records.

With reference to FIGS. 11 and 12, after task 176 a task 180 constructs a time-of-arrival (TOA) circle 182 and frequency-of-arrival (FOA) curve 184 for each geolocation record. FIG. 12 shows only one TOA circle 182 and FOA curve 184 for clarity. As shown in FIG. 12, TOA circles 182 are spherical shapes whose intersection with the earth's surface forms a circle that defines possible locations for PDU 40. The radius of this sphere is determined based on the propagation delay of signals traveling between PDU 40 and satellite 14. The possible locations are on the perimeters of TOA circles 182. Although FIG. 12 shows only one TOA circle 182 for clarity, those skilled in the art will appreciate that multiple circles 182 from respective multiple geolocation records should overlap one another to some degree, with smaller diameter circles resulting from location pulses transmitted when satellite 14 and PDU 40 are closer to one another.

FOA curves 184 are hyperbolas that represent the possible locations that would result in location pulses having the Doppler observed in each location record. FIG. 12 shows only one FOA curve 184 for clarity, but those skilled in the art will appreciate that multiple curves generally resemble other curves similar to the one shown in FIG. 12 but slightly rotated.

When multiple geolocation records are characterized by task 180, one error ellipse (not shown) is produced from performing a weighted least squares average of the errors associated with TOA circle 182 and FOA curve 184. Error in the measurements arise from many sources, for example, thermal noise, oscillator drift, etc. The area within error ellipse indicate the most probable locations for PDU 40.

After task 180, a task 190 finds the intersection between the curves. As shown in FIG. 12, an ambiguity exists because TOA circle 182 and FOA curve 178 intersect each other at two points. This ambiguity may be resolved by consulting the identity of the cell 38 from which location pulses were recorded, as indicated by boundary curve 178.

When multiple geolocation records are utilized, the approximate center of the area of intersections between error ellipses indicates the geolocation for PDU 40. The precision of the geolocation determination is reflected by the integration of the error ellipse and a "priori" knowledge of the circle of error probability. Those skilled in the art will appreciate that as more location records are included in the calculations of tasks 180 and 190, the smaller this area will become and the more precise the geolocation will become. As discussed above, PDU 40 can be programmed so that as many location pulses are generated or monitored as are needed to achieve a desired degree of precision.

With reference to FIG. 11, tasks 192 and 194 are performed by a CSO 16 in the remote position determining embodiment of the present invention. Task 192 sends a message to PDU 40 informing PDU 40 of its location, and task 194 records the transaction for future billing purposes. The billing record may be forwarded to an appropriate billing center (not shown) via network 12 at an appropriate time. As discussed above in connection with FIG. 9, PDU 40 may save its geolocation data in a table and then transmit the geolocation data to MO 28 at a convenient time. Of course, CSO 16 may alternately send the geolocation data directly to MO 28.

In summary, the present invention provides an improved system, method, and/or apparatus for remote position determination. Position determination in accordance with the preferred embodiments of the present invention is worldwide in scope, reliable, flexible, and inexpensive. The world-wide scope is achieved through a world-wide communications infrastructure provided by network 12. Reliability is achieved by the ubiquitous coverage of network 12, the power management of PDU 40, and the use of a single communications network to both determine position and report position. PDU 40 becomes operational only when a high likelihood exists for successfully generating and/or communicating location data. The power management of PDU 40 extends battery life. Flexibility is achieved through the programmability of PDU 40. The programmability of PDU 40 allows costs to be minimized because only those communication services that are needed to achieve a desired degree of tracking are utilized. In addition, the inexpensive nature of the present invention results from the use of a communications infrastructure which supports numerous applications, such as voice communication, not only position determination. Hence, the infrastructure overhead cost may be supported by numerous diverse applications in proportion to the applications' use of the infrastructure.

The present invention has been described above with reference to preferred embodiments. However, those skilled in the art will recognize that changes and modifications may be made in these preferred embodiments without departing from the scope of the present invention. For example, others may devise alternate procedures to accomplish substantially the same functions as those described herein. Memory structures other than those depicted herein may by employed. Moreover, while the preferred embodiments described herein relate to a particular orbital geometry, footprint geometry, and position determination algorithm, those skilled in the art will appreciate that the present invention may be applied to different geometries and algorithms that accomplish substantially the same thing. These and other changes and modifications which are obvious to those skilled in the art are intended to be included within the scope of the present invention.

What is claimed is:

1. A method for operating a mobile position determining unit (PDU) in cooperation with a communication system having an orbiting satellite projecting a plurality of communication cells and a monitoring office, said method comprising the steps of:

from one of said plurality of communications cells, receiving an acquisition signal originating from said orbiting satellite, wherein said orbiting satellite projects at least said one of said plurality of communication cells toward the PDU and said acquisition signal includes cell location information which enables determination of at least one cell location of said one of said plurality of communication cells;

cooperatively communicating with said orbiting satellite to exchange at least one location pulse to determine a position of said PDU, wherein said communicating step uses said cell location information to resolve data describing said position; and transmitting from said PDU to said communication system via said orbiting satellite, said data describing said position of said PDU for immediate delivery to said monitoring office for evaluation of said position.

2. A method as claimed in claim 1 wherein said cooperatively communicating step comprises the steps of:

transmitting a first location pulse and a second location pulse from said PDU for receipt at said satellite, said second location pulse being delayed from said first location pulse by a predetermined amount of time;

measuring data from said first location pulse and said second location pulse; and said PDU collecting said data used by a processing center for determining said position of said PDU, said processing center being a node in said communication system.

3. A method as claimed in claim 1 additionally comprising, prior to said receiving step, the step of programming said PDU to become operational upon the occurrence of a predetermined event.

4. A method as claimed in claim 3 wherein said programming step comprises the steps of:

receiving programming data from said communication system; and storing, in response to said programming data, data which describe conditions to be met prior to said PDU becoming operational.

5. A method as claimed in claim 4 additionally comprising the step of repeating said programming data receiving and storing steps to alter characteristics of said conditions.

6. A method as claimed in claim 3 additionally comprising the steps of:

monitoring, in response to said predetermined event, an environment proximate said PDU; and transmitting, from said PDU to said communication system, data describing said environment.

7. A method as claimed in claim 1 additionally comprising the steps of:

receiving a command from said communication system which instructs said PDU to transmit non-location data to said communication system; and transmitting, in response to receipt of said command, said non-location data to said communication system.

8. A method as claimed in claim 7 wherein said non-location data comprises data describing operational parameters of transmissions then-currently being transmitted.

9. A method for tracking mobile objects from a remotely located monitoring office using communication services provided by a communication system having an orbiting satellite projecting a plurality of communication cells, said method comprising the steps of:

physically associating a position determining unit (PDU) with said mobile object;

programming said PDU to become operational upon the occurrence of a predetermined event; and said PDU determining, in response to said predetermined event, a current position for said PDU by performing the steps of (i) from one of said plurality of communications cells receiving, in response to said predetermined event and prior to said determining step, an acquisition signal originating from said orbiting satellite, wherein said orbiting satellite projects at least said one of said plurality of communication cells toward the PDU and, said acquisition signal includes cell location information which enables determination of at least one cell location of said at least one communication cell; (ii) exchanging at least one location pulse with said satellite; (iii) determining data describing a position for said PDU using said at least one location pulse; (iv) resolving said data describing said position using said cell location information; and (v) transmitting from said PDU to said communication system via said orbiting satellite, said data describing said position of said PDU for immediate delivery to said monitoring office for evaluation of said position.

10. A method as claimed in claim 9 wherein said orbiting satellite moves in space relative to said PDU, and said determining step comprises the step of said PDU transmitting, in response to said acquisition signal, a first location pulse and a second location pulse from said PDU for receipt at said communication system, said second location pulse being delayed from said first location pulse by a predetermined amount of time to allow said first location pulse and said second location pulse to be transmitted by said PDU when said satellite is located at two different positions in space.

11. A method as claimed in claim 9 additionally comprising the step of delivering data describing said position of said PDU through said communication system to said monitoring office.

12. A method as claimed in claim 9 wherein said communication system includes a constellation of orbiting satellites distributed around the earth, wherein said at least one location pulse are exchanged within a predetermined portion of a radio frequency spectrum, and said method comprises the steps of:

reusing said portion of said radio frequency spectrum at diverse locations proximate the surface of the earth to carry other communications occurring simultaneously with said at least one location pulse; and locating said PDU in a predominantly rural area so that said other communications may take place in a predominantly urban area.

13. A method as claimed in claim 9 wherein said programming step comprises the steps of:

transmitting programming data through said communication system to said PDU; and storing, in response to said programming data, data which describe conditions to be met prior to said PDU becoming operational.

14. A method as claimed in claim 13 additionally comprising the step of repeating said transmitting and storing steps to alter characteristics of said conditions.

15. A method as claimed in claim 9 additionally comprising the steps of:

monitoring, in response to said predetermined event, an environment proximate said PDU; and transmitting, from said PDU to said communication system, data describing said environment.

16. A method as claimed in claim 9 additionally comprising the steps of:

receiving, at said PDU, a command from said communication system which instructs said PDU to transmit non-location data to said communication system; and transmitting, from said PDU in response to receipt of said command, said non-location data to said communication system.

17. An integrated telecommunication system for transporting voice communications and for transporting data communications between a monitoring office and remotely located mobile objects to aid in the location of said objects, said system comprising:

a constellation of radio communication stations orbiting the earth, wherein said radio communication stations project a plurality of communication cells with at least one communication cell toward the mobile objects;

a population of first subscriber units configured to engage in voice communications through said constellation;

a population of second subscriber units configured to engage in data communications through said constellation, each second subscriber unit being configured in cooperation with at least a portion of said radio communication stations to exchange at least one location pulse which is used to generate data which describe a location of said second subscriber unit, wherein an acquisition signal which originates from one of said plurality of communication cells of one of said radio communication stations includes cell location information of said one of said plurality of communication cells, said cell location information being used to resolve said location of said second subscriber unit; and means, in data communication with at least a portion of said radio communication stations, for transmitting immediately from said second subscriber unit to said monitoring office via said radio communication station for evaluation of said position, said location data describing said position of said second subscriber unit as cooperatively generated between said second subscriber unit and said radio communication stations.

18. A system as claimed in claim 17 wherein said radio communication stations are configured in cooperation with said first and second subscriber units so that said first and second subscriber units use substantially the same radio frequency spectrum.

19. A system as claimed in claim 17 wherein each of said second subscriber units comprises:

a memory device;

a transceiver; and a processor coupled to said memory device and said transceiver, said processor being configured to retrieve programming data received at said transceiver, to store said programming data in said memory device, and to control operation of said second subscriber units in response to said programming data.

20. A system as claimed in claim 19 wherein:

said transceiver of each of said second subscriber units comprises a transmitter and a receiver, each of said transmitter and receiver being configured for communication with any one of said radio communication stations;

each of said second subscriber units additionally comprises a battery selectively coupled to said transmitter and to said receiver thereof; and at least a portion of said programming data instructs said processor to control the coupling of said battery to said transmitter and receiver so that in an inactive mode of operation said battery couples to neither said transmitter nor said receiver, in a stand-by operational mode said battery couples to said receiver, and in a call-in operational mode said battery couples to both said receiver and transmitter.

21. A system as claimed in claim 17 wherein said means for transmitting comprises a processing station in radio communication with said constellation of radio communication stations and coupled to a public switched telecommunications network, said processing station being configured to determine locations from said location data.

* * * * *